F. W. MATTHEWS.
TALKING MOVING PICTURE APPARATUS.
APPLICATION FILED AUG. 20, 1914.
1,210,665.
Patented Jan. 2, 1917.
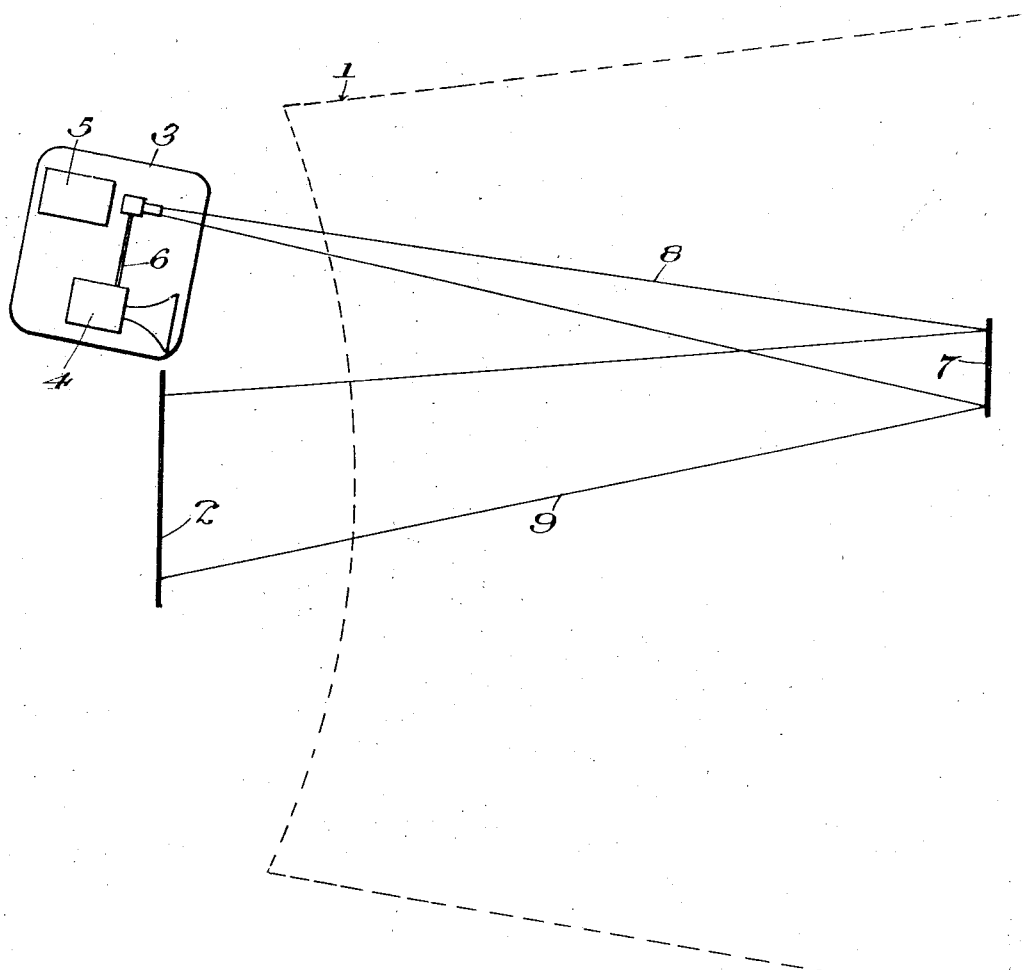
Witnesses:
Inventor.
Frederick W. Matthews.

UNITED STATES PATENT OFFICE.

FREDERICK WEBSTER MATTHEWS, OF LOS ANGELES, CALIFORNIA.

TALKING-MOVING-PICTURE APPARATUS.

1,210,665. Specification of Letters Patent. Patented Jan. 2, 1917.

Application filed August 20, 1914. Serial No. 857,651.

*To all whom it may concern:*

Be it known that I, FREDERICK W. MATTHEWS, a citizen of the United States, residing at Los Angeles, in the county of Los Angeles and State of California, have invented a new and useful Talking-Moving-Picture Apparatus.

Heretofore in the production of talking moving pictures it has been attempted to create the illusion of the talk coming direct from the picture and various expedients have been resorted to in the attempt to do this. One method has been to place the talking machine and projector behind the picture screen, but in this instance this was objectionable on account of the loss of light and sound which took place when the screen was between the audience and the projector apparatus and sound reproducing device. Another method has been to place the talking machine at the side of the screen and the projector in front of the screen at a proper distance but perfect synchronism could not be obtained as the projector and talking machine could not be reliably connected through a distance. The talking machine and projector could be mechanically coupled together on one base and located at the rear of the auditorium and directed toward the screen but while in this instance synchronism is produced the illusion of the sound coming from the picture is entirely lost.

The mechanical synchronism has been accomplished by means of belting the machines or by shafts extending through the auditorium but on account of the distance between the machines this has proven unreliable and expensive to install necessitating two operators, one at each machine and causing difficulty in communication between them where instant understanding is necessary. Synchronism by means of electric motors has proven unreliable and in most cases requires two operators.

In the present invention I couple the talking machine and projector directly together, for example mechanically with a simple shaft locating both instruments upon a single base and I place this unit at the screen preferably close to one side thereof. As thus arranged the projector will throw the rays forward over the heads of the audience and I provide a reflector at a suitable point in the auditorium to reflect these rays back and throw them against the screen. In this manner there is perfect synchronism between the talking machine and projector as it is not difficult to mechanically couple them together on the same base by means of gears and it is impossible for one to operate at a different speed from the other. The talking machine is located so close to the screen that it gives the illusion of the voice or other sound coming from the screen. It is the employment in the combination of the reflector which turns the rays back against the screen which enables me to locate the projector in front of the audience and to couple it direct to the talking machine in a simple and reliable manner and at such a point adjacent to the screen as to give the effect of the sound coming from the screen.

In the drawings the figure is a plan view of the invention.

The dotted line 1 designates the portion of the auditorium in which the people are seated.

2 designates the screen upon which the moving picture is thrown and which is located at the front-end of the auditorium and faces the audience.

3 designates a base upon which is mounted a talking machine 4 and a picture projector 5, these two machines being set at an angle relative to the extended plane of the screen and being connected together directly by a shaft 6 so that they operate in perfect synchronism.

7 designates a reflector which may be located rearward of the screen at an intermediate point in the auditorium above the audience, or it may be located at the back part of the auditorium. This reflector is parallel to the screen and out of axial alinement with the screen and receives the rays 8 from the projector and throws them back as rays 9 against the screen 2. The picture projector 5 is set at an angle relative to the extended plane of the screen, and out of axial alinement with the reflector. With this arrangement the talking machine is located immediately adjacent one edge of the screen 2 so that the most perfect illusion is obtained and perfect synchronism is obtained by reason of the mechanical connection between the talking machine and the projector.

What I claim is:

Talking moving picture apparatus comprising a projecting machine and a talking machine located adjacent to one another, means positively connecting the two for synchronous operation, a viewing screen adjacent to the two machines and a reflector
5 remote from the machines for receiving the image and reflecting it to the screen.

In testimony whereof, I have hereunto set my hand at Los Angeles, California, this 14th day of August 1914.

FREDERICK WEBSTER MATTHEWS.

In presence of—
  M. J. BUTLER,
  LORRAINE E. DURROW.